Feb. 21, 1928.
J. W. HOBBS
1,659,976
WELDED RAIL JOINT
Filed Aug. 26, 1927    2 Sheets-Sheet 1
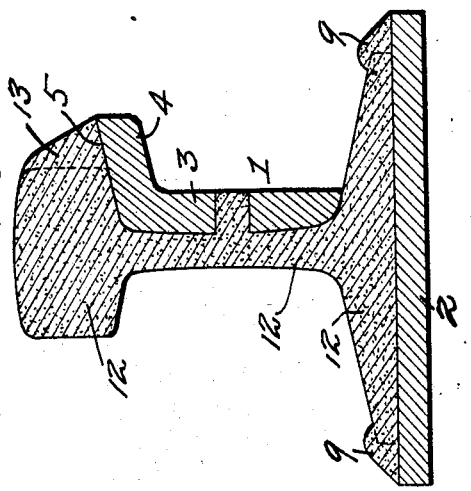
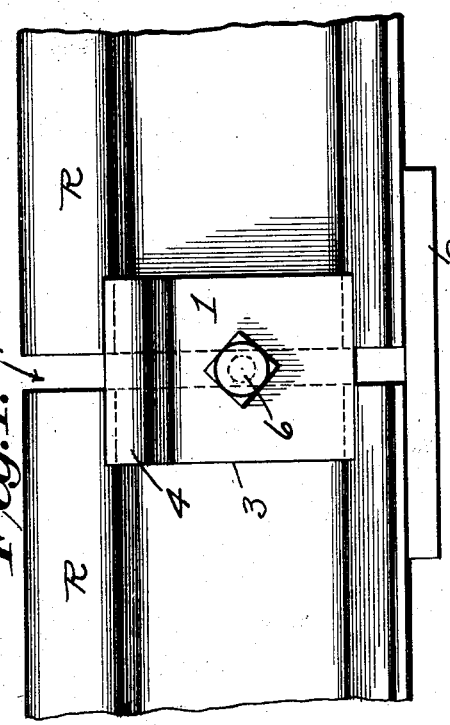
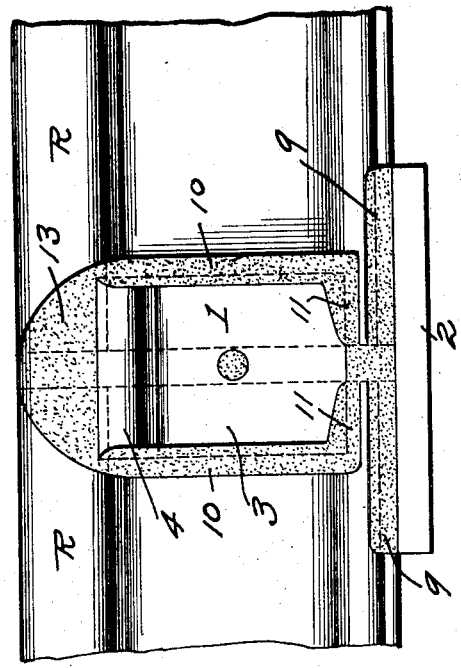
Inventor
James W. Hobbs, Feb. 21, 1928.  1,659,976
J. W. HOBBS
WELDED RAIL JOINT
Filed Aug. 26, 1927   2 Sheets-Sheet 2

Inventor
James W. Hobbs,

WITNESSES:

By his Attorney

Patented Feb. 21, 1928.

1,659,976

UNITED STATES PATENT OFFICE.

JAMES W. HOBBS, OF BANGOR, MAINE, ASSIGNOR TO THE RAIL JOINT COMPANY, OF NEW YORK, N. Y., A CORPORATION OF NEW YORK.

WELDED RAIL JOINT.

Application filed August 26, 1927. Serial No. 215,633.

This invention relates to an improvement in welded rail joints and primarily has for its object the production of a joint of that kind meeting all standard requirements at a low cost of installation.

A practical and important object of the invention is to provide a welded rail joint requiring but little material and labor, thus, effecting a substantial economy in both. Furthermore, it is the purpose of the invention to provide a construction of extreme simplicity, yet possessing great strength so that a substantial and efficient rail-splicing joint is provided, and in which the welding is so disposed with reference to the plates and with reference to the rail ends that a continuity of weld is provided between the rail ends in a manner to provide a permanent union between the rails and a running surface that will successfully resist pounding out or cupping under the severest traffic conditions. Also, in the same connection the invention has in view a simple but effective arrangement of the joint plates whereby the plates effectively reinforce the weld, thus aiding in the realization of that object of the invention which is to provide a strong rail joint or splice between the two rail ends as well as a strong and permanent welded union between the rails and all other parts of the joint.

The essential features of the invention necessarily are susceptible of a wide range of structural modification without departing from the spirit or scope of the invention, but certain preferred and practical embodiments thereof are shown in the accompanying drawings, in which:—

Figure 1 is a side elevation of a welded rail joint constructed in accordance with the present invention, the weld metal being omitted.

Figure 2 is a central vertical sectional view showing the set-up of the rail joint prior to the welding operations.

Figure 3 is a view similar to Fig. 1 showing the joint fully welded.

Figure 4 is a view similar to Fig. 2 showing the joint fully welded.

Figure 6:
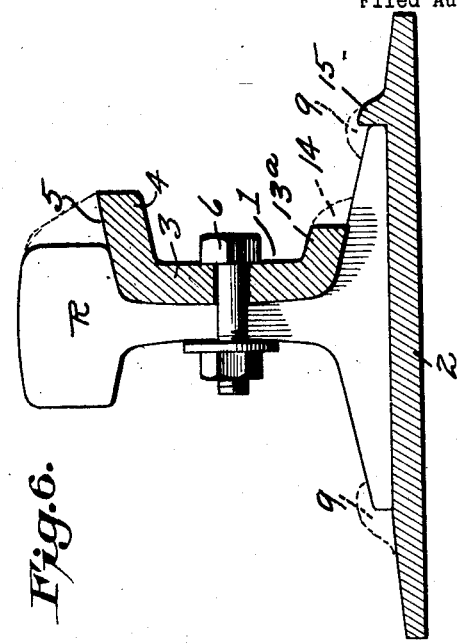
Figure 6 is a view similar to Fig. 2 showing a modification that may be resorted to in the joint plates forming a part of the welded joint.

Primarily the invention includes in its organization the two rail ends R—R to be joined, a side joint plate 1 and a base or sole plate 2. The side joint plate 1 may be of any acceptable or approved design but in its preferred form, as shown in Figs. 1 to 4 inclusive, the same consists of an upright clamping member 3 fitting the webs of the rails at one side only thereof and an upper outstanding inclined head flange 4 engaging under the rail heads at one side and projecting beyond the side faces of the rail heads to provide a welding shelf or ledge 5 which is utilized in connection with the welding of the joint, as hereinafter more particularly referred to.

It will have been observed that the side joint plate 1 is a relatively small plate, the same usually being a plate of approximately three inches in length and adapted to be held in operative relation to the rail ends by means of a small holding bolt 6 extending through a bolt opening in the side plate and passing through the welding gap 7 which is provided by a predetermined separation of the adjacent rail ends R—R.

With reference to the base or sole plate 2, this plate preferably is about double the length of the side joint plate 1 and extends beneath the rail bases, spanning the gap between the rail ends. Also, the base or sole plate 2 is of greater width than the rail bases so as to project beyond the edges of the rail flanges, and provide at such points welding ledges or shelves 8 to facilitate the welding, by seam or fillet welds, of the edges of the base plate to the edges of the rail base flanges.

From the construction described it will be seen that the side joint plate 1 being at one side only of the rails, and the base or sole plate 2 spanning the gap between the rail ends at the bases of the rails, that the welding gap 7 is closed only at one side by the said side plate 1 and at the bottom by the base or sole plate 2, the same being entirely open and accessible from the one side and at the top of the joint, thus providing a capacious and fully accessible space in which the welding operation is conducted to provide for welding together the rail ends and also the plates to the rails.

When welding this construction of joint it is preferable to use the well-known electric welding process and the first step in the operation of welding is to suitably clamp or hold the base plate 2 to the bases of the rails, in the position shown in the drawings, and then to secure the base plate firmly in position by starting the base seam welds 9 upon the welding ledges 8, beginning at the center and working towards each end of the plate, which operation allows the plate to expand during welding. These base seam welds 9 are not completed at this initial operation, but are merely started for the purpose of fastening the plate 2 in position and permitting the clamping or holding means for the plate to be removed. When this has been done the seam or fillet welds 10 are formed between the side edges of the side plate 1 and the webs of the rail and a bottom seam weld 11 is also formed between the bottom edge of the side plate 1 and the upper sides of the rail base flanges. When this has been accomplished, thus providing for completely and permanently welding the side plate to both rail ends, the small holding bolt 6 may then be removed and the welding of the joint completed in the welding gap 7. To accomplish this final step the weld metal is introduced into the welding gap 7 and under the welding action of an electric arc the weld metal which constitutes the welding bond between the two rail ends is filled in and built up from the upper side of the base plate 2, against the inner side of the side joint plate 1 exposed to the welding gap, and throughout the entire area of said welding gap up to and between the rail heads thus providing a complete welded bond 12 entirely filling the space between the rail ends and welded to such rail ends to provide a continuous weld.

The final step of welding consists in forming a fillet or seam weld 13 over the welding shelf or ledge 5 in the angle or fillet between said shelf or ledge 5 and the adjacent side faces of the rail heads. Then the remainder of the base seam welds 9 are completed throughout the length of the base plate 2 at both side edges thereof, thus completing the joint.

Figure 7:
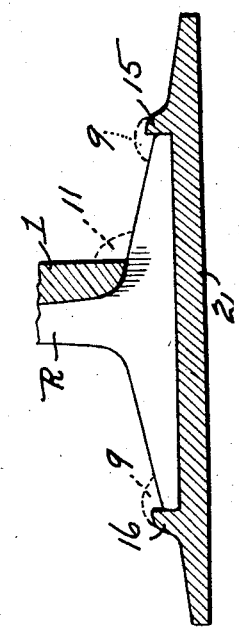
Figure 7 is a view similar to Fig. 5 showing another modified form of side plate and a two-shouldered base plate that may be employed in carrying forward the objects of the invention.

By way of illustrating the range of modification that may be resorted to in carrying out the invention there is shown in Fig. 6 of the drawings a modified form of side base plate, the modification consisting in forming a downwardly and outwardly projecting foot flange 13ᵃ at the bottom edge of the side joint plate, which foot flange overlies the rail base flange, contributes additional strength to the joint plate, and affords a substantial rib which may be welded to the rail base flange by a fillet or seam weld 14. Also, in the modification of Fig. 6 is shown a base plate 2 having a rail flange engaging shoulder 15 at one side of the joint, and in Fig. 7 of the drawings is illustrated a modification of the invention wherein the base or sole plate is shown provided with two shoulders 15 and 16 respectively at opposite sides of the joint and providing between them a shallow channel in which the rail ends are seated.

Figure 8:
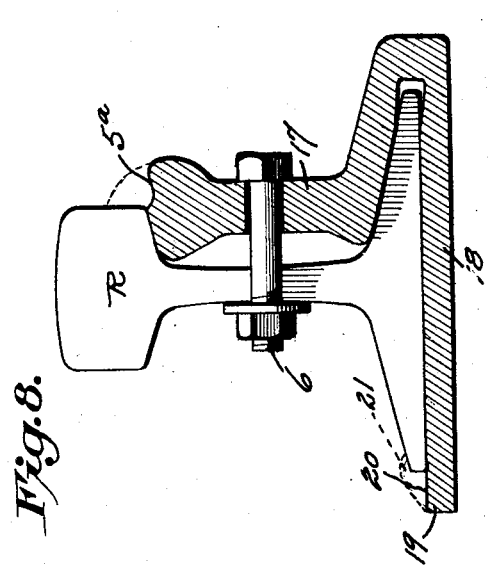
Figure 8 is a vertical sectional view showing another modification of the invention illustrating a type of joint plate of the form of the continuous rail joint which provides a rail supporting base member beneath the bases of the rails.
Figure 5:
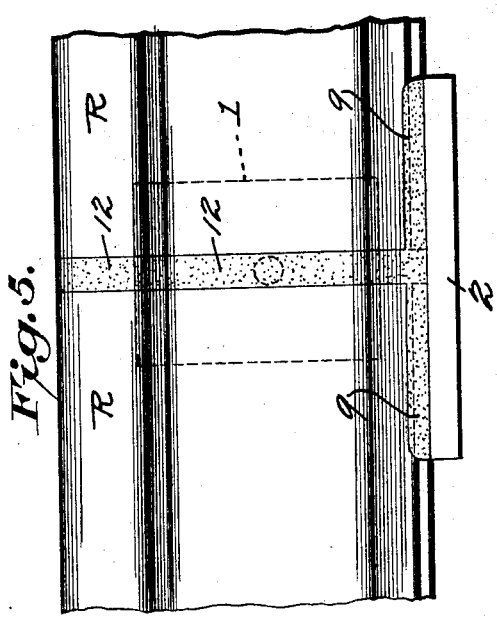
Figure 5 is a side elevation of the welded joint from the side opposite the joint plate.

Another form of the invention that may be resorted to wherein an exceptional and stable rail joint structure is required is suggested in Fig. 8 of the drawings. In this modification there is shown a joint plate of the continuous rail joint type that has a joint plate having the upright splicing member 17 fitting into the fishing spaces of the rail ends and formed with an integral rail supporting base plate 18 extending beneath and entirely across the rail bases and projecting at one edge as at 19 beyond the adjacent edges of the rail flanges to provide a welding ledge or shelf 20 in which is formed a fillet or seam weld 21 for welding the base member 18 to the rail bases. Also in this form of the invention the upright splicing member 17 of the joint bar is shown provided with an outstanding welding ledge or shelf 5ᵃ corresponding to the welding shelf or ledge 5 previously described.

In all these or any other embodiments or modifications of the invention the distinctive feature of the invention is preserved, namely, that of the joint plate at one side only of the rails, the base member at the undersides of the rails and spanning the gap therebetween and the welding gap between the rail ends entirely exposed from one side and at the tops of the rails, which welding gap is intended to be occupied by the weld bond 12 which unites with the rail ends and with both of the plates.

From the foregoing it is thought that the construction and many advantages of the invention will now be obvious without further description and it will be understood that changes in the form, proportion and minor details of construction may be resorted to, without departing from the spirit of the invention and scope of the appended claims.

I claim:—

1. A welded rail joint including the spaced rail ends forming a welding gap therebetween, and a joint plate fitting one side only of the rail ends, and welds.

2. A welded rail joint including the spaced rail ends forming a gap therebetween, a single joint plate fitting one side only of the rail ends and bridging said gap, and welds.

3. A welded rail joint including the spaced rail ends forming a gap therebetween, a single joint plate fitting one side only of the rail joint and bridging the said gap, a base plate underlying both rail bases and bridging said gap, and welds.

4. A welded rail joint including the spaced rail ends forming a welding gap therebetween, a single joint plate fitting the fishing spaces of the rail ends at one side only and bridging the gap, welds between the plates and the rail ends, and a welding bond filling said welding gap.

5. A welded rail joint including the spaced rail ends forming a welding gap therebetween, a single joint plate fitting the fishing spaces of the rail ends at one side only and bridging the gap, welds between the plate and the rail ends, and a welding bond filling said gap and united with the inside of the joint plate.

6. A welded rail joint including, in combination, the spaced apart rail ends forming a welding gap therebetween, a joint plate bridging the gap at one side only of the rail ends, a base plate underlying the rail bases and bridging the gap, and a welding bond built-up upon the base plate between the rail ends and united with the inner side of the joint plate.

7. A welded rail joint including, in combination, the rail ends spaced apart to form a welding gap therebetween, a fishing member engaging the rail ends at one side only, a base member underlying the rail bases, a welding bond built-up upon the base plate within said welding gap and united with the fishing member, and separate welds between the rails and the said fishing and base members.

8. A welded rail joint including, in combination, the rail ends spaced apart to provide a welding gap between them, a joint plate fitting the fishing spaces of the rail ends at one side only of the rail ends and provided at its upper edge with a projecting top flange forming a welding ledge, welds between the edges of the plate and the rails, a weld formed upon said welding ledge between the plate and one side of the rail heads, and a welding bond built-up within the welding gap and united with the inner side of the joint plate.

9. A welded rail joint including, in combination, the rail ends spaced apart to provide a welding gap therebetween, a flanged plate fitting the fishing spaces of the rail ends at one side only, a base underlying the rail ends and bridging the gap, separate welds between the edges of the plate and the rail ends, separate welds between the edge portions of the base plate and the rail flanges, and a weld bond built-up within the welding gap upon the base plate and against the inner side of the joint plate.

10. A welded rail joint including, the rail ends spaced apart to provide a welding gap therebetween, and a splicing member arranged at one side only of the rail ends thereby to leave the welding gap entirely open, for welding purposes at one side of the joint and from the top between the rail heads.

In testimony whereof I hereunto affix my signature.

JAMES W. HOBBS.